United States Patent

Goebbels

[15] 3,639,832
[45] Feb. 1, 1972

[54] ELECTRICAL BRIDGE APPARATUS FOR AND METHOD OF MEASURING MECHANICAL FORCES BY MAGNETOELASTIC MEMBERS

[72] Inventor: Hermann Goebbels, Brockenberg, Germany

[73] Assignee: EMA-Dorries GmbH, Stolberg, Germany

[22] Filed: Dec. 11, 1969

[21] Appl. No.: 884,130

[52] U.S. Cl. .......................... 324/34 R, 73/133, 323/75 J, 323/75 M, 324/60 B, 324/61 B
[51] Int. Cl. .................................................. G01r 33/00
[58] Field of Search .............. 324/34 R, 34 S, 34 ST, 34 TR, 324/60 B, 61 B; 323/75 M, 75 J; 73/133 B

[56] References Cited

UNITED STATES PATENTS

| | | | |
|---|---|---|---|
| 2,053,560 | 9/1936 | Janovsky | 324/34 |
| 2,557,393 | 6/1951 | Rifenbergh | 73/13.6 |

FOREIGN PATENTS OR APPLICATIONS

| | | | |
|---|---|---|---|
| 442,441 | 2/1936 | Great Britain | 73/133 B |
| 1,052,717 | 1/1954 | France | 324/34 |

*Primary Examiner*—Michael J. Lynch
*Assistant Examiner*—R. J. Corcoran
*Attorney*—Arthur O. Klein

[57] ABSTRACT

Force-measuring apparatus and method employing two similar measuring members, one loaded and the other unloaded, carrying magnetizing windings disposed in different branches of a bridge energized by alternating current. The present invention changes the energy relationships of the magnetizing fields by providing additional measuring circuits and auxiliary circuits with inductive, capacitive and ohmic resistance or resistance combinations which, when load changes occur, bring about changes in the measuring potential such as to increase the measuring voltage output, at least substantially linearize the measuring members, and substantially or wholly eliminate the creep or creeping effects of the measuring members.

3 Claims, 6 Drawing Figures

ELECTRICAL BRIDGE APPARATUS FOR AND METHOD OF MEASURING MECHANICAL FORCES BY MAGNETOELASTIC MEMBERS

This invention relates to an apparatus for and a method of measuring mechanical forces by means of a circuit which includes two magnetoelastic members in different branches of a bridge, one of the members being unloaded and the other being subjected to the force to be measured.

The invention is directed to an improved arrangement wherein power output of the measuring installation is increased, measuring members made without any post treatment may be at least substantially linearized, and the creep or creeping effects may be substantially or wholly eliminated. These objects are accomplished by the changing of the energy relationships of the magnetizing fields.

The above and further objects will be apparent from the following specification. In the drawings which accompany and form a part of the specification:

Figure 1:
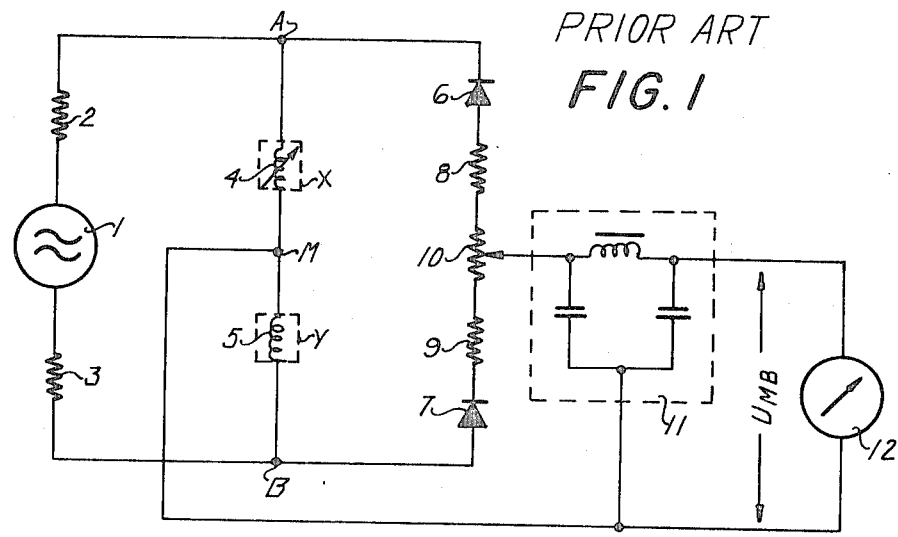
FIG. 1 is a circuit diagram of a prior art force-measuring system.

As illustrated in FIG. 1 there are already known installations for measuring mechanical forces which consist of a magnetoelastic measuring member that is loadable and a magnetoelastic measuring member which is not loaded. These measuring members are arranged in a rectifier-compensator circuit which is energized by means of an alternating current. The rectifier-compensator circuit monitors the energy takeup changes resulting from a change of load conditions on the loadable measuring member by means of a measuring circuit.

The alternating current source 1 is connected via preresistances 2 and 3 to the branching points A and B of the bridge. One branch of the measuring bridge consists of a loadable or active measuring member X with a magnetization winding 4 and a nonloadable or passive measuring body Y with a magnetization winding 5; member Y may be referred to as a passive measuring system or as a compensator-measuring member. The other bridge branch consists of an arrangement comprising a tap point M from which a line leads to an indicating instrument, regulating instrument or similar device 12. It further includes, connected in series, two rectifiers 6 and 7, two resistances 8 and 9, and the winding of a potentiometer 10 for the zero-tapping-off of the diagonal of the measuring bridge via the contact point M and via a filtering circuit arrangement 11.

In order to receive an electrical signal which is closely proportional to the force applied to member X in a measuring process as described hereinabove and using the measuring circuit illustrated in FIG. 1, the measuring members X and Y must be subjected to several thermal post treatments. Such treatments, which take place after the mechanical manufacturing process, produce the required magnetic properties in the measuring members. The duration of the annealing process and the annealing temperature must be varied in accordance with the linear deviations that are present in a measuring member. After each thermal post treatment, the magnetic winding must be again applied to the measuring member, and the characteristic line or curve having the least linearity deviation in a plot of the load characteristic line at differing magnetic current intensities must be found. The manufacture of this type of magnetoelastic force measuring installation is, therefore, very costly. In addition, numerous significant differences of the characteristic curve of the individual measuring members may occur, even if the measuring members are subjected to identical thermal post treatments, due to minor metallurgical differences or due to different effects of a mechanical nature, as for example, those due to rolling, pressing or drawing the raw material of the measuring member. Because of the foregoing drawbacks, a large percentage of finished measuring members must be discarded, particularly when high demands of linearity are required. Furthermore, it has been found that the force measuring members when utilized in conjunction with known measuring processes undergo more or less large creeping effects depending on the type of the alloy used and the type of pretreatment to which the measuring members have been subjected; these creeping effects are caused by the magnetic viscosity of the working material of the measuring member.

In the above-described measuring process, the energy of the alternating current circuit, in which the magnetization windings of the measuring members are situated, oscillates periodically between the inductances $L_A$ and $L_B$ of the magnetization windings 4 and 5 and the current source 1. The energy which is periodically taken up and released by the inductances of the magnetization windings represents the corresponding energy-content of the force field which is influenced by the magnetoelastic properties of the measuring members. This force field forms and decays with a frequency which is double that of the current flowing through the windings. The inductances $L_A$, $L_B$ are predetermined by the outputs of the magnetization windings and by the magnetic properties of the measuring members in the measuring installation illustrated in FIG. 1. The energy relationships, the magnetoelastic effects, and the thus resulting output power, that is, the electrical signals of the measuring installation, can be changed only by changing the current flowing through the magnetization windings. This change in current flow is effected by increasing or decreasing the values of the resistances 2 and 3.

The improvement of the measuring process effected by the present invention is brought about with the aid of additional alternating current resistances or resistance combinations, which are arranged in parallel or in series with the magnetization windings and/or also in the rectifier branches. This novel arrangement brings about the necessary energy relationships in the AC circuits with the magnetization windings which are necessary for obtaining the goal of optimum technical measuring effects. Investigations have indicated that the measuring process of the invention brings about a substantial increase in the power output of the measuring installation. It is even possible to utilize measuring members which, because of unfavorable mechanical or thermal pretreatment, exhibit an increasing or decreasing sensitivity as the load increases and thereby have significant deviations from linearity. Measuring members made without any post treatment of a thermal or mechanical nature, may be linearized in accordance with the invention in a very simple manner by changing the energy relationships of the alternating current circuit which produces the magnetizing field.

The measuring member can thus be linearized in such a way that it will meet the highest technical measuring requirements. It is further possible substantially or wholly to eliminate from such members creeping effects which cause positive as well as negative changes in the measuring potential. This can be done by means of a suitable arrangement and by the necessary adjustments for changing the energy relationships of the magnetizing fields. In accordance with this invention this is done by providing additional measuring circuits and auxiliary circuits which employ inductive, capacitive and ohmic resistances or resistance combinations which, when load changes occur, due to the creeping effects caused by the magnetic viscosity of the measuring member, bring about the necessary changes in the measuring potential.

The aforedescribed advantages can be obtained with relatively simple and inexpensive constructional elements (choke coils, condensers, ohmic resistances) which are incorporated in the compensation circuit without changing the force measuring means proper. The invention is further explained in conjunction with several embodiments thereof.

Figure 2:
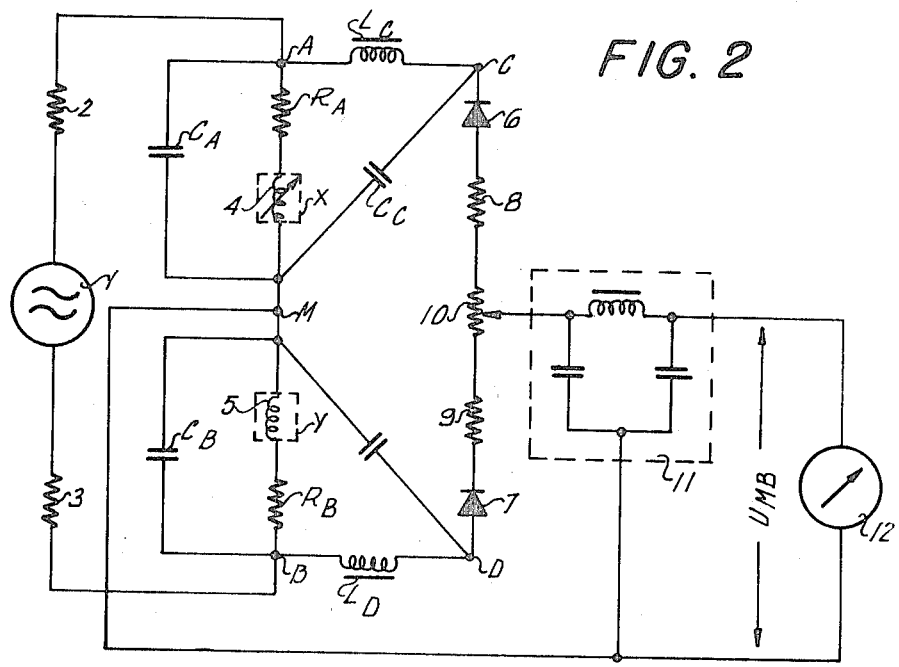
FIG. 2 is a circuit diagram of a force-measuring system in accordance with the invention.

FIG. 2 illustrates a measuring circuit which has the same basic operating principle as the circuit illustrated in FIG. 1 which has been described hereinabove. In accordance with the present invention, however, several additional elements are provided in the bridge branches A–M and B–M. Thus, it will be seen that these bridge branches have, as in FIG. 1, inductances $L_A$ and $L_B$ of the magnetization windings 4 and 5. These bridge branches, furthermore, include alternating current resistances $R_A$ and $R_B$, and may include capacitive resistances $C_A$ and $C_B$ which are connected in parallel with the respective magnetization windings. These circuit elements can bring about a widely ranging variation of the energy relationships in the bridge branches A–M and B–M and thereby influence important technical measuring characteristics, that is, measuring voltage, linearity deviations, and creeping effects. There is furthermore provided parallel to the resistances in the current paths A–M and B–M, an alternating current-resistance combination which consists of a series circuit with inductive resistances $L_C$ and $L_D$ and capacitive resistances $C_C$ and $C_D$, respectively.

A further feature of the invention resides in the fact that the rectifier branches (elements 6, 8 and 10, and 7, 9 and 10, respectively) are not connected to the branch points A and B of the measuring bridge circuit, but are connected to the junctions C and D of the aforementioned resistance combinations $L_C$ and $C_C$, and $L_D$ and $C_D$, respectively. As will appear hereinafter, capacitors $C_A$ and $C_B$ may be omitted in a modification of the circuit of FIG. 2. Measurements have shown that, when connecting the rectifier branch at the junctions C and D instead at the branch points A and B, the creeping effects are substantially reduced; when capacitors $C_C$ and $C_D$ are connected between junctions C and M, and junctions D and M, respectively, the creeping effects are substantially eliminated.

In addition thereto, it should be noted that it is not necessary, in order to obtain a favorable measuring technical relationship, that the circuit include the entire resistance combination as illustrated in FIG. 2, that is, $C_A$; $R_A$; $L_C$; $C_C$, and $C_B$; $R_B$; $L_D$; $C_D$, respectively. It may suffice, depending on the inherent load characteristic of the measuring member when used in the measuring circuit illustrated in FIG. 1, to use only one or the other of the resistance combinations in order to obtain the necessary relationships with respect to output, linearity and the creeping relationship of the measuring installation. In this connection, there will be considered as a first example, a measuring circuit which employs an inductance $L_C$ in series with a condenser $C_C$ and an inductance $L_D$ in series with a condenser $C_D$ in parallel with the inductances $L_A$ and $L_B$, respectively, of the magnetization windings 4 and 5. These alternating current resistance combinations are connected at the rectification branches of the junctions C and D as is illustrated in FIG. 2. Consequently, the ohmic resistances $R_A$ and $R_B$ and the parallel capacitors $C_A$ and $C_B$ are dispensed with. When the auxiliary means $L_C$, $C_C$ and $L_D$, $C_D$ are used in the measuring circuit in accordance with this invention, there results the hereinafter described characteristics which constitute an improvement of the hitherto known measuring process and apparatus.

Figure 3:
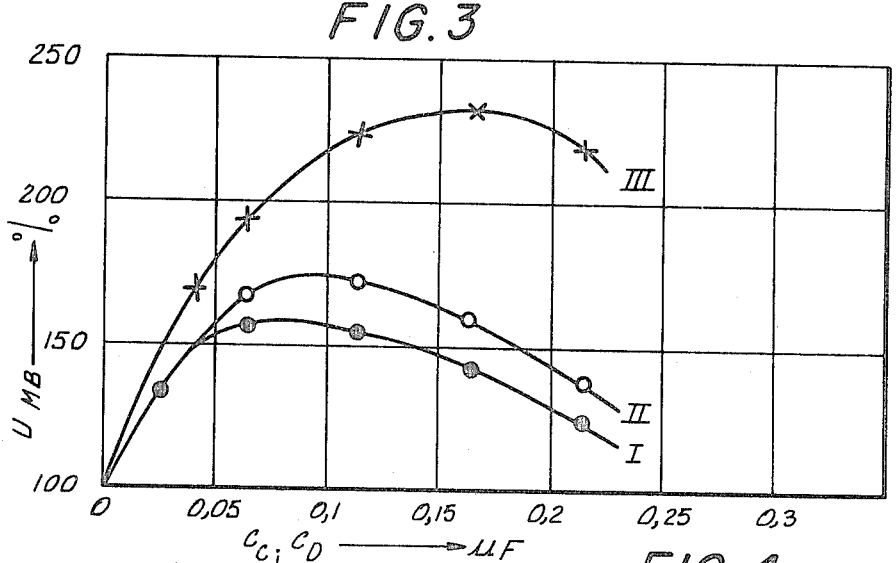
FIG. 3 is a graph showing the relationship between output voltage and the values of the condensers $C_C$ and $C_D$ in the circuit of FIG. 2.

In the diagram illustrated in FIG. 3, there is illustrated among other things, what type of increase of the output power, that is, measuring potential $U_{MB}$ results according to the value of the capacitive resistances $C_C$ and $C_D$ in the circuit of FIG. 2. In curves I and II of FIG. 2, $C_A=C_B=0$. The characteristic line I results when choke coils $L_C$; $L_D$ have an inductance value of 18 Hy. The reduction of the inductive resistance of these choke coils to 15 Hy results in curve II, in which it can be noted that the output voltage has increased. This is in the region of $C_C=C_D=0.05$ to 0.15 F which is approximately 50 to 70 percent higher than with the measuring process of the prior art, in which the energy relationships of the magnetization circuit are not changed by the presence of the $L_C$, $C_C$ and $L_D$, $C_D$ alternating current-resistance combinations.

The characteristic curve III of FIG. 3 gives the relationship between measuring potential $U_{MB}$ when $L_C=L_D=15$Hy, $C_C$ and $C_D$ have the same values as in curve II of FIG. 3, and $C_A=C_B=4$ $\mu$F. It can be seen that the output voltage $_{MB}$ of curve III is several times greater than those of either of curves I and II. Similar output increases can also be obtained by appropriate adjustment of the resistances $R_A$ and $R_B$.

Figure 4:
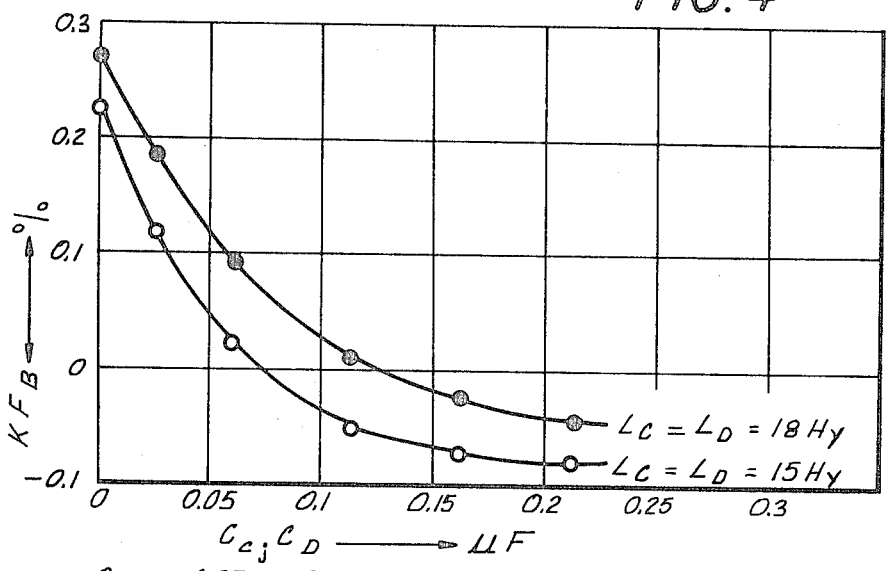
FIGS. 4 and 5 show a variety of curves illustrating creeping faults or deviations of measuring members under a number of conditions.
Figure 5:
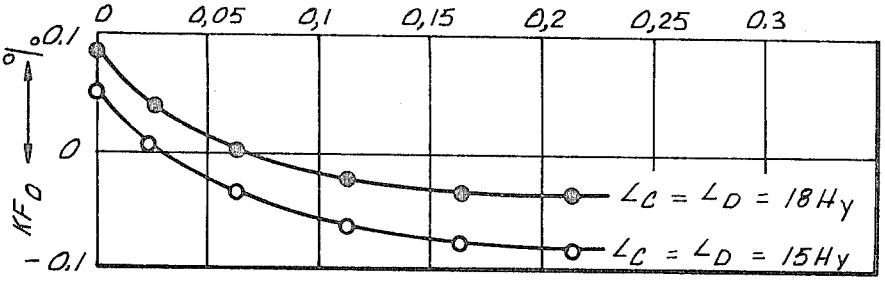

More important than the aforedescribed attainable output increase by means of the aforementioned resistance combinations $L_C$, $C_C$, and $L_D$, $C_D$ is the fact that it is possible to influence the creeping faults, that is, tendency to creep, of the measuring members. The reversal faults or hysteresis faults must be differentiated from the creeping faults. The last mentioned faults represent the largest percentagewise deviation of the load characteristic curve upon instantaneous unloading of the loaded measuring member from the unloaded characteristic curve. It is possible by selecting suitable working materials for the measuring members and by a corresponding suitable annealing process of the measuring members, assuming that significantly high magnetization current forces exist, almost completely to eliminate the hysteresis faults in magnetoelastic measuring members. By the expression "creeping faults" is meant the percentage change of the measuring potential at full load in successive measuring operations. The creeping of the measuring voltage, brought about by the magnetic viscosity of the material of which the measuring members are made practically completely ceases within 2 to 3 minutes. In the graphs of FIGS. 4 and 5, there are represented a variety of creeping fault-characteristic curves. These curves are those resulting from a circuit of the measuring bridge of the FIG. 2 wherein $R_A=R_B=0$ and $C_A=C_B=0$.

As can be seen in FIG. 4, the creeping faults $KF_B$ (measured 3 mins. after the measuring member X has been loaded) without series capacitances (that is, $C_C=C_D=0$) are largest. They can, however, be substantially reduced by means of the condensers $C_C$, $C_D$. The position of the creeping fault-characteristic curve can be influenced by the size of the inductive resistance (for example, $L_C=L_D=15$Hy in lieu of 18Hy) so that, in particular, when a standing load is present, the creeping fault $KF_B$ can be reduced to zero within a wide range of the series capacitances $C_C$, $C_D$.

The effect of the $L_C$, $C_C$; $L_D$, $C_D$, respectively, alternating current-resistance combination of the creep faults $KF_O$ (when unloading follows a preceding three minutes of load upon the measuring system) are, as indicated by the characteristic curves of FIG. 5, of a type similar to those that occur at the creep faults $KF_B$ of FIG. 4.

Figure 6:
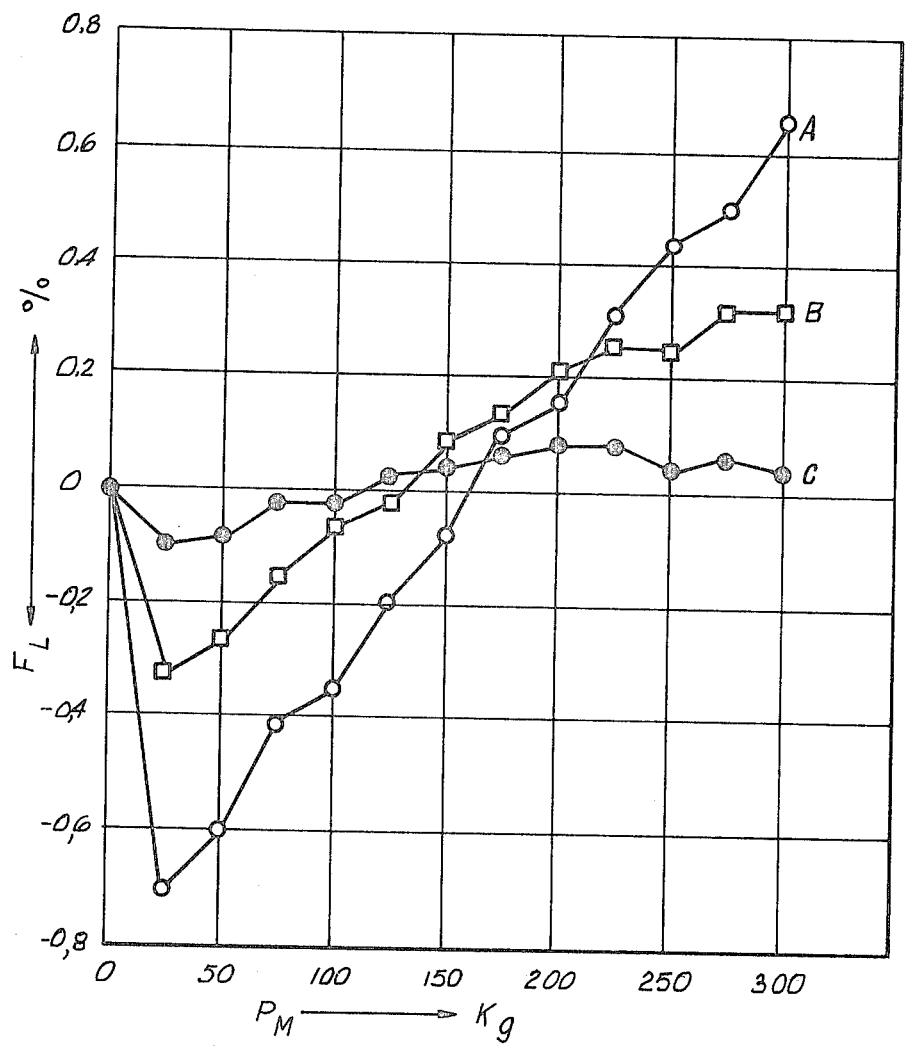
FIG. 6 contains three curves showing the degree to which linearity deviations of measuring members can be reduced by the method and apparatus of the invention.

FIG. 6 indicates to what degree the linearity fault or deviation of magnetoelastic force measuring installations can be reduced by utilizing the aforedescribed concept of the invention. The curve A indicates the linearity deviation of the load curve of a measuring system when utilizing the measuring bridge circuit of the prior art which is illustrated in FIG. 1. With the above-described energy and magnetization-relationships, the measuring arrangement has a sensitivity which rapidly increases with increasing load, so that the load characteristic curve has a maximum linearity fault or deviation of approximately plus or minus 0.7 percent. If, however, the circuit illustrated in FIG. 2 is employed, substantially different energy relationships are present in the alternating current circuit having the magnetization windings 4 and 5 from those existing in the circuit of FIG. 1. This is true whether or not capacitors $C_A$ and $C_B$ are employed. The thus resulting different adjusting relationships of the measuring installation manifest themselves clearly by means of the changed linearity deviations of the circuit.

The curve B illustrated in the diagram of FIG. 6 indicates as an example the linearity deviation which is present in the measuring arrangement when capacitors $C_A$ and $C_B$ are not employed ($C_A=C_B=0$), when the choke coils $L_C$, $L_B$ each has an inductance of 15Hy, and the capacitive resistances $C_C$ and $C_D$ are each 0.07$\mu$F. The maximum linearity deviation amounts in this case to only about plus or minus 0.32 percent. As the curve C indicates, all of the linearity faults or deviations are smaller than plus or minus 0.1 percent when the capacity values of the capacitors $C_C$ and $C_D$ are increased to $0.15 \mu F$.

In a manner similar to the above-described examples which utilize $L_C$, $C_C$ and $L_D$, $C_D$ combinations, the most important characteristic values (output capacity, linearity deviation, creeping fault) of magnetoelastic force measuring installations can be influenced in accordance with this invention, when the alternating current energy relationships of the magnetizing fields of the measuring members are varied. This is effected by connecting condensers $C_A$, $C_B$ in parallel with the magnetization windings 4, 5 of the inductances $L_A$, $L_B$, respectively, as shown in FIG. 2, with or without the resistances $R_A$, $R_B$ in series with the respective condenser $C_A$, $C_B$. With the aid of the condensers $C_A$ and $C_B$, it is possible in particular to linearize in a simple manner those measuring members which inherently have a falling (declining) load characteristic line; and it is also possible to achieve significant increases of the output capacity of the measuring installation. Thus, results comparable to those of curve III of FIG. 3, wherein the output of a circuit according to FIG. 2 are shown, may be obtained when $C_A$ and $C_B$ have appropriate values other than zero. Similar output increases can be obtained by corresponding adjustment of the resistance values of the resistances $R_A$ and $R_B$.

The expression "magnetic viscosity," which is used above, may also be referred to as "magnetic after-effect." The definition of this expression is given in the book entitled "Handbuch der Physik," written by H. Geiger and Karl Scheel (publisher Julius Springer, Berlin), 15th edition (1927) on page 186, a translated excerpt of which reads as follows:

"It is questionable whether in the same instant, in which the energized field force has reached its value, the magnetization also has reached its corresponding value. What is certain is that the magnetization value is reached in a very short period of time, smaller than a fraction of a second; thereafter the process is frequently practically at an end. However, in a number of cases the magnetization still changes by a measurable amount even seconds later, sometimes even after several minutes have elapsed. These oscillations are referred to as "-magnetic after-effect" or "magnetic viscosity." Eddy current effects without doubt play a role in such cases. One can assume that a whole number of magnetization directions remain in the crystals in an unsteady balanced state, so that the most minute shocks or field oscillations, which are always present, suffice to bring about a further series of reversals. Due to this phenomenon, there occurs in its vicinity a change in the mutual influence of the crystals on each other, which again causes (however in probably a smaller number) shifting into an unsteady balanced state, which in turn again causes minor disturbances (a tipping reversal, etc.), until the whole process decays."

Applicant believes that the observed creeping of the measuring voltage is caused by the magnetic viscosity of the working material of the measuring members. He is not, however, to be bound by the above theory of the cause of magnetic viscosity.

Although the invention has been illustrated and described with reference to two preferred embodiments thereof, it is understood that it is in no way limited to the details of such embodiments but is capable of numerous modifications within the scope of the appended claims.

What is claimed is:

1. In apparatus for measuring mechanical forces with two measuring members of which one is capable of accepting a load and the other is not loadable, the members having magnetization windings which are arranged in a bridge circuit, the bridge having the two magnetization windings in first and second branches connected to each other at a first junction, the third and fourth branches having rectifiers therein, the bridge being fed with alternating current at the junctions beyond the ends of the series connected magnetization windings, the measuring voltage being taken off the bridge from the junctions between the first and second and between the third and fourth branches, the improvement comprising a combination of a series connected inductance and condenser connected in parallel with each of the respective magnetization windings, the resistances being such as to increase the output potential of the bridge, to decrease deviations from linearity, and to lower the creeping fault of the first measuring member caused by the magnetic viscosity of the measuring member, each of the series connected inductance and condenser combination comprising a series connected choke coil and a condenser, the third and fourth branches of the bridge circuit being each connected to the junction between the respective choke coil and condenser.

2. Apparatus according to claim 1, comprising an ohmic resistance connected in series with the respective magnetization winding in each of the respective first and second branches of the bridge.

3. Apparatus according to claim 1, comprising a second condenser connected in parallel with the respective magnetization windings.

* * * * *